United States Patent [19]

Heinrich et al.

[11] 3,984,199
[45] Oct. 5, 1976

[54] WATER-INSOLUBLE MONOAZO DYESTUFFS

[75] Inventors: Ernst Heinrich; Horst Kindler, both of Frankfurt am Main-Fechenheim; Joachim Ribka, Offenbach am Main-Burgel, all of Germany

[73] Assignee: Cassella Farbwerke Mainkur Aktiengesellschaft, Germany

[22] Filed: Dec. 10, 1973

[21] Appl. No.: 423,177

Related U.S. Application Data

[62] Division of Ser. No. 336,183, Feb. 27, 1973, abandoned.

[30] Foreign Application Priority Data

Mar. 16, 1972 Germany............. 2212755

[52] U.S. Cl. .................. 8/41 C; 8/41 R; 8/41 A; 8/41 D; 260/164
[51] Int. Cl.² ............. D06P 3/52; D06P 1/04; C09B 29/36
[58] Field of Search............. 260/164; 8/41 R, 41 A, 8/41 B, 41 C, 41 D

[56] References Cited
UNITED STATES PATENTS

2,499,800   3/1950   Trepagnier................. 8/46
3,123,433   3/1964   du Pelony.................. 8/41
3,787,178   1/1974   Renfrew.................... 8/41 C

OTHER PUBLICATIONS

Gilman, H. et al, "Some Azo Derivatives of 9-Ethylcarbazole", J. Org. Chem., vol. 22, pp. 562–564 (1957).
Allan, Z. J., et al, Chem. Abst., 54, 24,570h (1960).

*Primary Examiner*—Christopher A. Henderson, Jr.
*Attorney, Agent, or Firm*—Connolly and Hutz

[57] ABSTRACT

Dyestuffs of the formula:

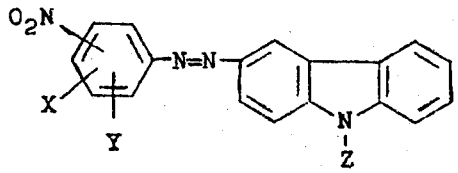

wherein X and Y are hydrogen, halogen, cyano, nitro, alkyl, alkylsulfonyl or alkoxy and Z is hydrogen or an optionally substituted alkyl, alkenyl, cycloalkyl, aralkyl or aryl radical and the utility thereof in the dyeing and printing of synthetic hydrophobic materials.

1 Claim, No Drawings

WATER-INSOLUBLE MONOAZO DYESTUFFS

CROSS REFERENCE TO RELATED APPLICATION

This application is a division of application Ser. No. 336,183, filed Feb. 27, 1973, and now abandoned.

The monoazo dyestuffs of the present invention are free of ionic groups and are of the formula:

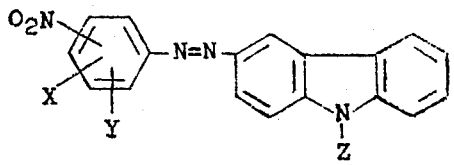   I wherein X and Y are each hydrogen; halogen; cyano; nitro or alkyl, alkylsulfonyl or alkoxy having 1 to 6 carbon atoms and Z is hydrogen; alkyl or alkenyl having 1 to 6 carbon atoms; said alkyl or said alkenyl substituted by cyano, hydroxy, acetoxy, alkoxy having 1 to 4 carbon atoms, phenoxy, monoalkylamino having 1 to 4 carbon atoms or dialkylamino having 1 to 4 carbon atoms in each alkyl moiety; phenalkyl having 1 to 2 carbon atoms in the alkyl moiety; cycloalkyl having 3 to 6 carbon atoms; phenyl or phenyl substituted by cyano or alkyl or alkoxy having 1 to 4 atoms.

The preferred cycloalkyl moieties for Z include cyclopentyl and cyclohexyl. The cycloalkyl radicals may be substituted with, for example, cyano or alkyl or alkoxy having 1 to 4 carbon atoms. When X and Y are halogen, they are preferably chlorine or bromine.

The dyestuffs of the instant invention may be obtained by diazotizing an amine of the formula:

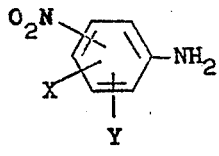   II and coupling the resulting product with a carbazole of the formula:

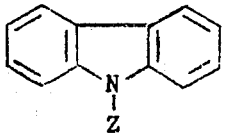   III

X, Y and Z in the foregoing formulae having the meanings set forth above.

It is also possible to diazotize mixtures of two or more amines of formula II and to couple the resulting product with a carbazole derivative of formula III or a mixture of two or more such carbazole derivatives. The resulting product is a mixture of the dyestuffs of formula I and in certain instances has particularly advantageous properties.

Suitable amines of formula II, include, for example:
2-, 3- or 4-nitroaniline
2-nitro-4- or 6-methylaniline
2-nitro-4,6-dimethylaniline
2-nitro-4-methoxy- or 4-ethoxyaniline
2-nitro-4-chloro- or 4-bromoaniline
2-nitro-4-methylsulfonyl- or 4-n-hexylsulfonylaniline
3-nitro-4-methoxy- or 4-ethoxyaniline
3-nitro-6-methoxy- or 6-ethoxyaniline
3-nitro-4-cyanoaniline
2-methyl-, 2-ethyl- or 2-isopropyl-4-nitroaniline
2-methoxy-, 2-ethoxy- or 2-n-butoxy-4-nitroaniline
3-methoxy-4-nitroaniline
2,5-dimethoxy- or 2,5-diethoxy-4-nitroaniline
2-chloro- or 2-bromo-4-nitroaniline
2-cyano-4-nitroaniline
2,6-dichloro-or 2,6-dibromo- 4-nitroaniline
2-chloro-6-bromo-4-nitroaniline
2-cyano-4-nitro-6-chloro- or 6-bromoaniline
2-methylsulfonyl-4-nitroaniline
2-methylsulfonyl-4-nitro-6 -chloro- or 6-bromoaniline
2,4-dinitroaniline
2,4-dinitro-6-chloro- or 6-bromoaniline
2,4-dibromo-6-cyanoaniline
2,4,6-trinitroaniline Suitable coupling components of formula III include those wherein Z in hydrogen, methyl, ethyl, propyl, isopropyl, vinyl, α-methylvinyl, allyl, butyl, isobutyl, sec.-butyl, amyl, isoamyl, hexyl, 2-dimethylaminoethyl, 2-diethylaminoethyl, 2-cyanoethyl, 2-hydroxyethyl, 2-acetoxyethyl, 2-phenoxyacetoxyethyl, 1-methyl-2-hydroxyethyl, 3-hydroxypropyl, 2-methoxyethyl, 2-ethoxyethyl, 2-phenoxyethyl, 3-methoxypropyl, cyclohexyl, benzyl, 3-methylbenzyl, phenyl, 2-methylphenyl, 4-methylphenyl, 2,4-dimethylphenyl, 4-cyanophenyl, 2-methoxyphenyl or 4-methoxyphenyl.

The dyestuffs of the instant invention are particularly suitable for dyeing and printing synthetic hydrophobic materials such as polyolefins, polyvinyl compounds, polyacrylonitrile, polyamides, cellulose-2½-acetate, cellulose triacetate and especially polyesters, such as polyethylene glycol terephthalate. There are obtained, when following the usual dyeing and printing processes, deep yellow, yellow-brown, orange and red dyeings and prints which have excellent fastness properties, particularly excellent light and sublimation fastness. The orange dyestuff of the present invention, having the formula

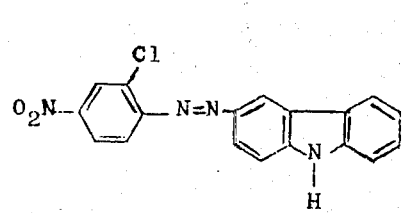

possesses particularly valuable properties. In addition to its excellent light fastness, excellent sublimation or thermofixing properties, it has a very good synthesis capacity and a great coloring power.

The dyeing of synthetic hydrophobic materials with the dyestuffs of the present invention may be carried out from an aqueous suspension including, if necessary, the presence of a carrier, at a temperature between 80° and 140°C. or by use of the so-called thermofixing process at a temperature of about 180° to 230°C. Printing of these materials may be carried out in such a manner that the goods printed with the instant dyestuffs, if necessary in the presence of a carrier, are treated with steam at a temperature between about 80° and 140°C. or are treated in accordance with the so-called thermofixing process at a temperature of about 180° to 230°C.

The dyestuffs of the present invention are equally adapted for the dyeing of the before-mentioned hydrophobic materials in organic solvents and for the dyeing en masse.

The following examples are for the purpose of illustrating the present invention.

EXAMPLE 1 a. In 150 parts by weight glacial acetic acid there are diazotized 17.2 parts by weight 2-chloro-4-nitroaniline with 34.2 parts by weight nitrosyl sulfuric acid (41.3%). The clear diazo solution is then allowed to run into a solution of 18.4 parts by weight carbazole in 100 parts by weight dimethylformamide. During coupling, the temperature is maintained at 10° to 15°C. by exterior cooling. Following coupling, the dyestuff is recovered, afterwashed with methanol and dried. It is an orange powder and dissolves in concentrated sulfuric acid to produce a red-violet color which, upon standing, turns red.

b. Into 2000 parts by weight water, there is introduced 1 part by weight of the dyestuff of (a) having the formula:

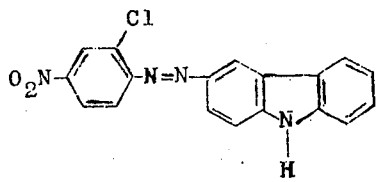

This mixture is standardized with acetic acid to a pH value of 5–6 and mixed with 4 parts by weight ammonium sulfate and 2 parts by weight of a commercial dispersing agent which is a naphthalene sulfonic acid-formaldehyde condensate. Into the resulting dyebath, there are introduced 100 parts by weight of a polyethylene glycol terephthalate polyester fabric and dyeing proceeds for 1½ hours at 120° to 130°C. After washing, reductive aftertreatment with a 0.2% alkaline sodium dithionite solution for 15 minutes at 60°–70°C., washing and drying, there is obtained a deep, orange dyeing having very good fastness properties, particularly high light fastness.

EXAMPLE 2 a. Following the procedure described in Example 1(a), 18.3 parts by weight of 2,4-dinitroaniline are diazotized and then coupled with 18.4 parts by weight of carbazole. After stirring for 1 hour, the reaction solution is mixed with 60 parts by weight anhydrous sodium acetate and agitated overnight at 10°–15°C. The resulting dyestuff is then filtered with suction, washed with methanol, subsequently washed with water and then dried. It is a dark red powder which dissolves to produce a red-violet color in concentrated sulfuric acid.

b. Into a printing paste which contains 45 parts by weight carob bean flour, 6 parts by weight of the sodium salt of 3-nitrobenzene-sulfonic-acid and 3 parts by weight of citric acid per 1000 parts by weight of paste, there is incorporated in finely divided form, 30 parts by weight of the dyestuff of Example 2(a) having the formula:

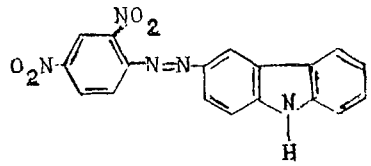

After printing with this paste, drying and fixing in the thermofixing frame for 45 seconds at 215°C., washing and finishing as described in Example 1(b), there is obtained a reddish-orange print of very good fastness properties. The same dyestuff yields an orange print of very good coloristic properties in the printing of triacetate fabric when it is used in the form of the above printing paste and the printed fabric, after drying, is steamed for 10 minutes at 1.5 atmospheres gauge pressure, washed, seaped, again washed and dried.

EXAMPLE 3 a. Employing the procedure of Example 1, 16.4 parts by weight of 2-cyano-4-nitroaniline are diazotized, coupled with 21.4 parts by weight N-ethylcarbazole and isolated. The resulting dyestuff is a dark red powder which yields a blue color upon dissolving in concentrated sulfuric acid.

b. A fabric of polyethylene glycol terephthalate is padded at 30°C. with a bath which contains 30 parts by weight of the finely divided dyestuff of Example 3(a) having the formula:

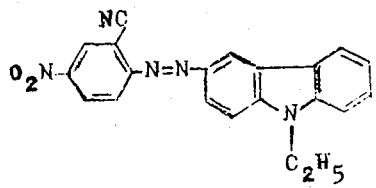

1.0 parts by weight polyacrylamide having a K value of 120, 0.5 parts by weight of a polyglycol ether of oleyl alcohol and 968.5 parts by weight of water. After drying, fixing is carried out for 60 seconds at 210°C. In the thermofixing frame. After a subsequent washing and finishing as described in Example 1(b), there is obtained a red dyeing of excellent fastness properties.

EXAMPLE 4

A solution of 2 parts by weight of the dyestuff of Example 3(a) in 1500 parts by weight of tetrachloroethylene is employed in the treatment of 100 parts by weight polyester material for 30 minutes at 121°C. The treated material is washed with warm and cold tetrachloroethylene and a full, red dyeing of very good coloristic properties is obtained.

Equally good red dyeings are obtained if the polyester material of the preceding paragraph is replaced by 100 parts by weight cellulose triacetate or cellulose-2½-acetate and dyeing is carried out for 45 minutes at 110°C. or for 45 minutes at 80°C.

The following tabulation presents further dyestuffs of the present invention which are prepared by the procedures described in Examples 1–3. When treating polyester materials with these dyes, there is obtained yellow, yellow-brown, orange and red dyeings or printings having very good fastness properties.

General formula:

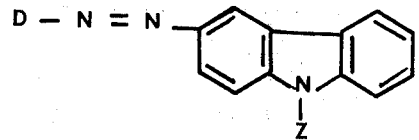

| No. | D | Z | No. | D | Z |
|---|---|---|---|---|---|
| 1. | $O_2N$–(phenyl with Cl, Cl) | –H | 9. | $O_2N$–(phenyl with $H_3C$–$O_2S$, Cl) | –H |
| 2. | $O_2N$–(phenyl with Br) | –H | 10. | $O_2N$–(phenyl with $H_3C$–$O_2S$, Br) | –H |
| 3. | $O_2N$–(phenyl with CN) | –H | 11. | $O_2N$–(phenyl with $O_2N$, Cl) | –H |
| 4. | $O_2N$–(phenyl with Br, Br) | –H | 12. | $O_2N$–(phenyl with $O_2N$, Br) | –H |
| 5. | $O_2N$–(phenyl with Cl, Br) | –H | 13. | $O_2N$–(phenyl with Br, CN) | –H |
| 6. | $O_2N$–(phenyl with NC, Br) | –H | 14. | $O_2N$–(phenyl with $O_2N$, $NO_2$) | –H |
| 7. | $O_2N$–(phenyl with NC, Cl) | –H | 15. | $O_2N$–(phenyl with $O_2N$, Br) | –$CH_2$–$CH_3$ |
| 8. | $O_2N$–(phenyl with $H_3C$–$O_2S$) | –H | 16. | $O_2N$–(phenyl with NC, Br) | " |

| No. | D | Z | No. | D | Z |
|---|---|---|---|---|---|
| 17. | 4-Cl, 2-(SO₂CH₃), 5-NO₂-phenyl | –CH₂–CH₃ | 29. | 4-Cl, 2,6-(NO₂)₂-phenyl | '' |
| 18. | 4-NO₂-phenyl | '' | 30. | 2,4,6-(NO₂)₃-phenyl | '' |
| 19. | 2,4-(Cl)₂-phenyl with NO₂ | '' | 31. | 4-Cl, 2-NO₂-phenyl | –H |
| 20. | 2,6-(Cl)₂, 4-NO₂-phenyl | '' | 32. | 4-Br, 2,6-(NO₂)₂-phenyl | –CH₂–CH₃ |
| 21. | 2,6-(Br)₂, 4-NO₂-phenyl | '' | 33. | 4-Br-phenyl | –H |
| 22. | 2-CN, 6-Cl, 4-NO₂-phenyl | '' | 34. | 2-NO₂, 4-(SO₂CH₃)-phenyl | –H |
| 23. | 4-NO₂, 2-(SO₂CH₃), 6-Br-phenyl | '' | 35. | 2-NO₂, 4-(SO₂-(CH₂)₃CH₃)(n)-phenyl | –CH₂–CH₃ |
| 24. | 3-Br, 5-NO₂, 2-CN-pyridyl | '' | 36. | 2-NO₂, 4-(SO₂-(CH₂)₅CH₃)(iso)-phenyl | '' |
| 25. | 2,4-(NO₂)₂-phenyl | '' | 37. | 2-NO₂, 4-OCH₃-phenyl | –H |
| 26. | 2-Br, 4-NO₂-phenyl | '' | 38. | 2-NO₂, 4-OCH₃-phenyl | –CH₂–CH₃ |
| 27. | 2-Cl, 4-NO₂, 5-Br-phenyl | –CH₂–CH₃ | 39. | 2-NO₂, 4-OC₂H₅-phenyl | –H |
| 28. | 2-(SO₂CH₃), 4-NO₂-phenyl | '' | 40. | 2-NO₂, 4-O-(CH₂)₃CH₃(n)-phenyl | –CH₂–CH₃ |

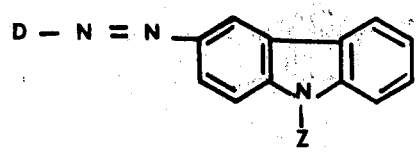
| No. | D | Z | No. | D | Z |
|---|---|---|---|---|---|
| 41. | 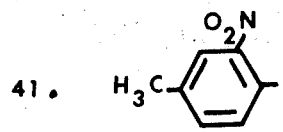 | —H | 53. | 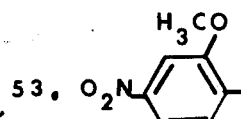 | —H |
| 42. | 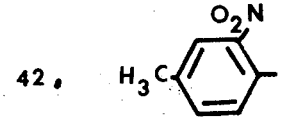 | —CH$_2$—CH$_3$ | 54. | 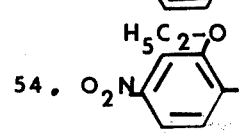 | —CH$_2$—CH$_3$ |
| 43. | 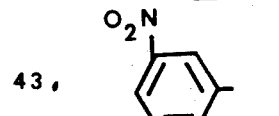 | —H | 55. | 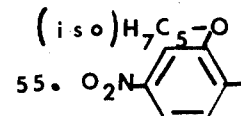 | ″ |
| 44. | 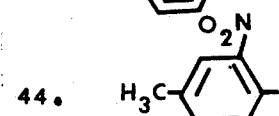 | —H | 56. | 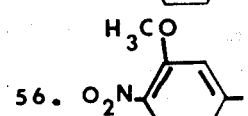 | —H |
| 45. | 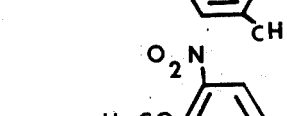 | —CH$_2$—CH$_3$ | 57. | 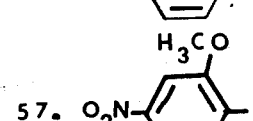 | —H |
| 46. | 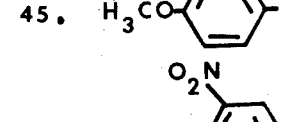 | —H | 58. | 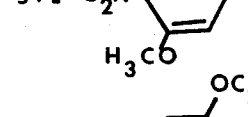 | —H |
| 47. | 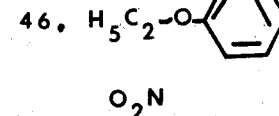 | —H | 59. | 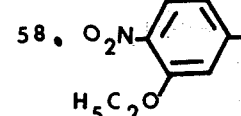 | —CH$_3$ |
| 48. | 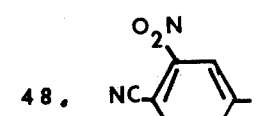 | —H | 60. | 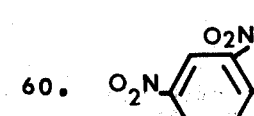 | ″ |
| 49. | 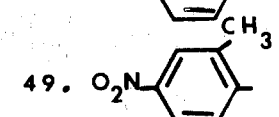 | —H | 61. | 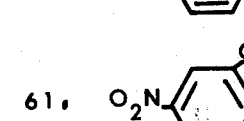 | ″ |
| 50. | 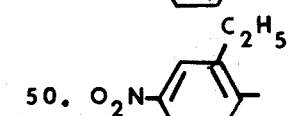 | —H | 62. | 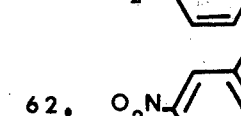 | ″ |
| 51. | 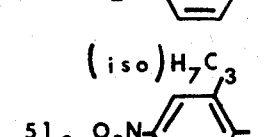 | —CH$_2$—CH$_3$ | 63. | 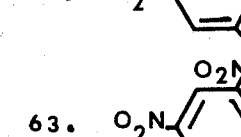 | ″ |
| 52. | 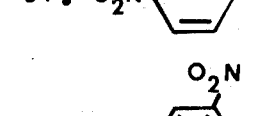 | —H | 64. | 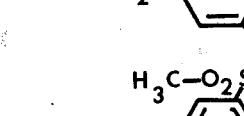 | —CH=CH$_2$ |

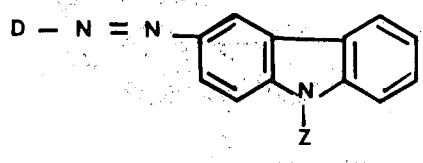

| No. | D | Z | No. | D | Z |
|---|---|---|---|---|---|
| 65. | 2,4-dinitro-6-cyanophenyl | '' | 75. | 2,4-dinitrophenyl | -CH₂-CH₂-CH₃ |
| 66. | 4-nitro-2-cyanophenyl | -CH=CH-CH₃ | 76. | 2-nitro-4-bromophenyl | '' |
| 67. | 4-nitro-2-cyano-5-bromophenyl | '' | 77. | 2,4-dinitro-6-cyanophenyl | '' |
| 68. | 4-nitro-2-methylsulfonyl-5-chlorophenyl | '' | 78. | 4-nitro-2-chlorophenyl | -CH(CH₃)₂ |
| 69. | 4-nitro-2-chlorophenyl | -CH=CH-CH₂-Cl | 79. | 4-nitro-2,6-dichlorophenyl | -CH₂-CH₂-CH₂-CH₃ |
| 70. | 4-nitro-2,6-dichlorophenyl | -C(CH₃)=CH-CH₃ | 80. | 4-nitro-2-cyano-5-chlorophenyl | -CH₂-CH₂-CH₂-CH₃ |
| 71. | 2,4-dinitrophenyl | -CH₂-CH₂-CN | 81. | 4-nitro-2-methylsulfonyl-5-bromophenyl | '' |
| 72. | 4-nitro-2-cyanophenyl | '' | 82. | 2,4-dinitrophenyl | -C(CH₃)₃ |
| 73. | 4-nitro-2,6-dichlorophenyl | '' | 83. | 4-nitro-2-bromophenyl | -CH₂-CH(CH₃)₂ |
| 74. | 4-nitro-2-chlorophenyl | '' | 84. | 4-nitro-2-chloro-5-bromophenyl | '' |

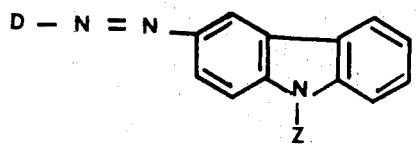
| No. | D | Z | No. | D | Z |
|---|---|---|---|---|---|
| 85. | 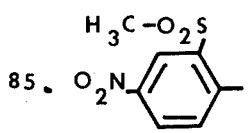 | 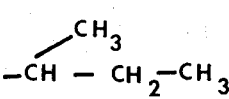 | 94. | 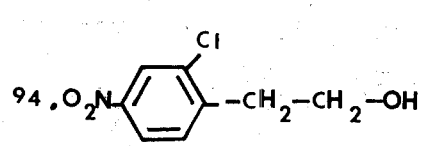 | |
| 86. | 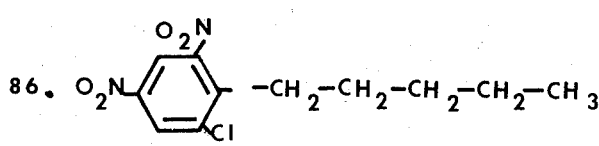 | 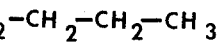 | 95. | 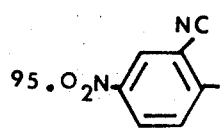 | " |
| 87. | 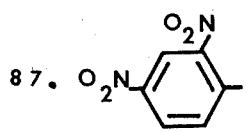 | " | 96. | 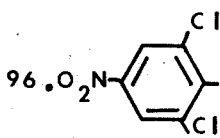 | " |
| 88. | 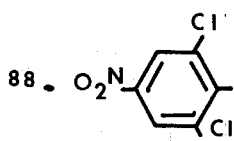 | 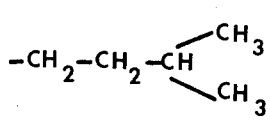 | 97. | 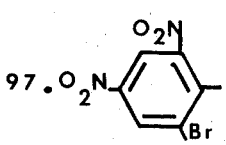 | " |
| 89. | 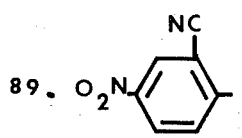 | 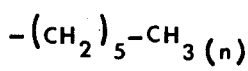 $-(CH_2)_5-CH_3$ (n) | 98. | 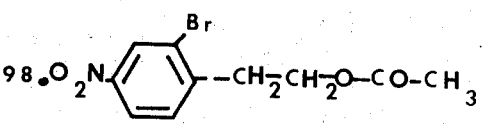 | |
| 90. | 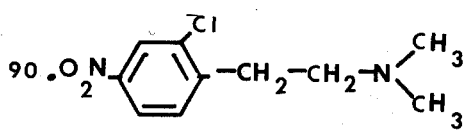 | | 99. | 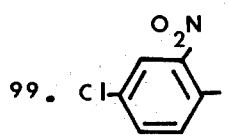 | " |
| 91. | 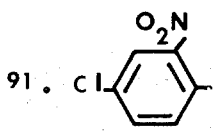 | " | 100. | 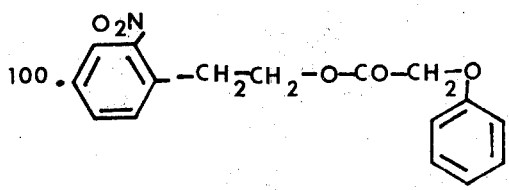 | |
| 92. | 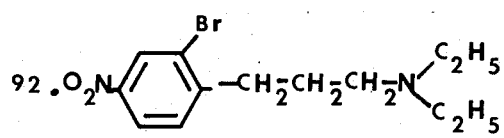 | | 101. | 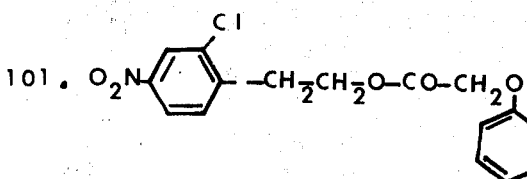 | |
| 93. | 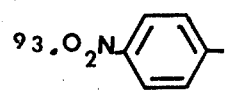 | " | 102. | 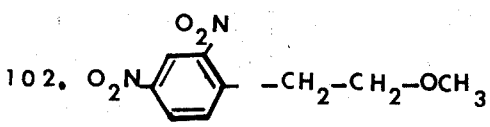 | |

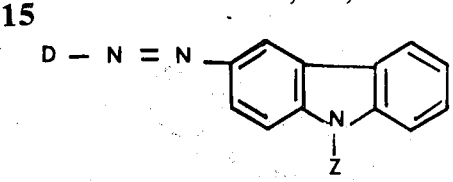
| No. | D | Z | No. | D | Z |
|---|---|---|---|---|---|
| 103. | 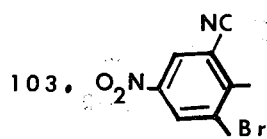 | " | 113. | 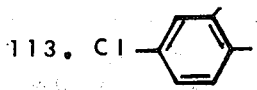 | " |
| 104. | 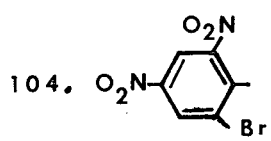 | " | 114. | 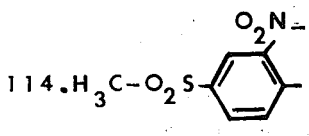 | " |
| 105. | 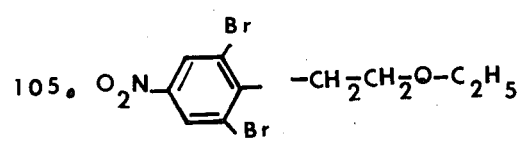 | | 115. | 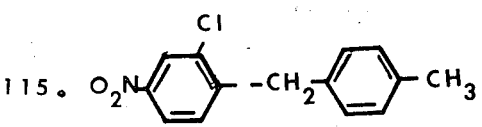 | |
| 106. | 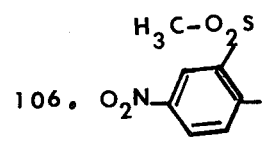 | " | 116. | 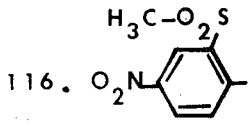 | " |
| 107. | 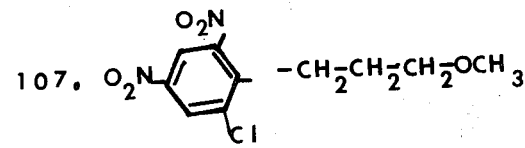 | | 117. | 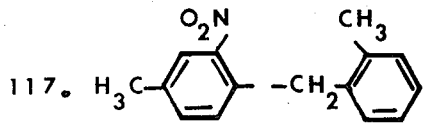 | |
| 108. | 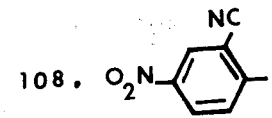 | " | 118. | 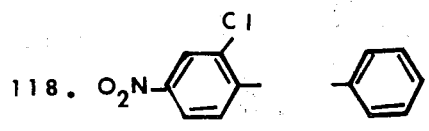 | |
| 109. | 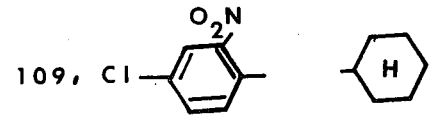 |  | 119. | 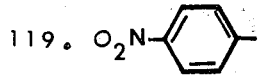 | " |
| 110. | 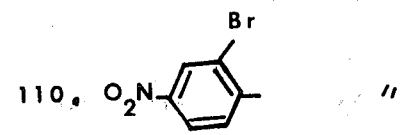 | " | 120. | 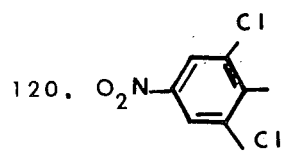 | " |
| 111. | 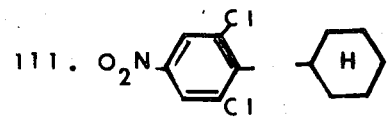 | 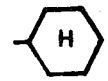 | 121. | 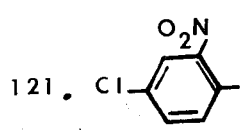 | 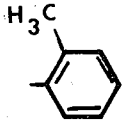 |
| 112. | 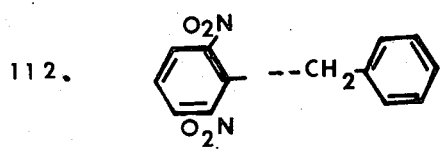 | | 122. | 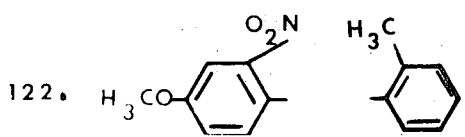 | |

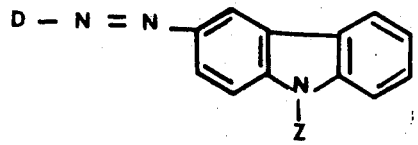
| No. | D | Z |
| --- | --- | --- |
| 123. | 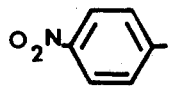 | 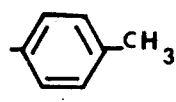 |
| 124. | 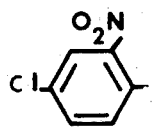 | " |
| 125. | 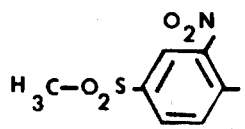 | " |
| 126. | 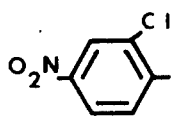 | 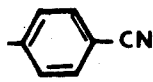 |
| 127. | 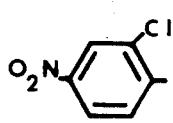 | 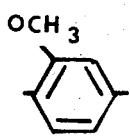 |
| 128. | 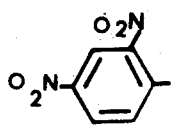 | 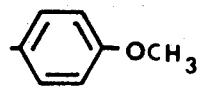 |
| 129. | 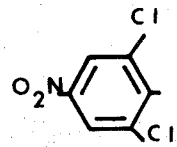 | 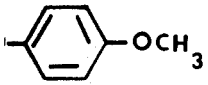 |
| 130. | 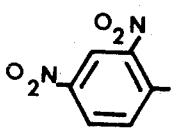 | 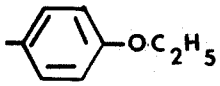 |
What is claimed is:
1. A process for dyeing and printing synthetic hydrophobic materials which comprises employing as the dyestuff, a monoazo dyestuff of the formula
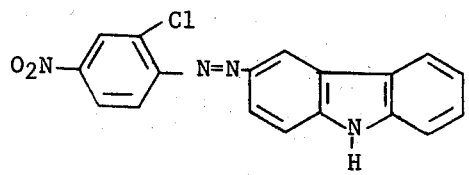
* * * * *